United States Patent Office 3,527,781
Patented Sept. 8, 1970

3,527,781
DISILACYCLOBUTANES
Gideon Levin, Midland, Mich., assignor to Dow Corning Corporation, Midland, Mich., a corporation of Michigan
No Drawing. Filed Sept. 1, 1967, Ser. No. 664,933
Int. Cl. C07d 103/02; C07f 7/08
U.S. Cl. 260—448.2    3 Claims

ABSTRACT OF THE DISCLOSURE

This invention relates to novel disilacyclobutanes and polymers made therefrom. The disilacyclobutanes are useful as lubricants and release agents, and the polymers contain perfluoroalkylethyl radicals along the chain which enhances the swell resistance of the polymers. The polymers also withstand extreme temperatures in an inert atmosphere. Illustrative of the compounds of this invention are disilacyclobutanes of the formula

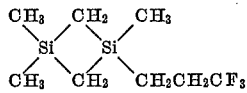

and polymers having repeating units of the formula

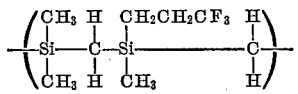

---

This invention relates to novel disilacyclobutanes and more particularly to disilacyclobutanes which contain a perfluoroalkylethyl radical attached to the silicon atom.

Disilacyclobutanes of a similar nature have been previously described in the art, e.g., U.S. Pat. No. 3,178,392; however, the prior art disilacyclobutanes are restricted in that only certain functional groups can be attached to the silicon atom (halogen, alkoxy, and hydrogen).

It is an object of the present invention to provide novel compounds which are similar to the above with the exception that the disilacyclobutanes of this invention contain a perfluoroalkylethyl radical attached to the silicon atom. The novel disilacyclobutanes are useful as lubricants and release agents and are of particular importance in the preparation of silmethylene polymers which contain perfluoroalkylethyl radicals along the chain. These silmethylene polymers withstand high temperatures in an inert atmosphere and exhibit exceptional swell resistance in the presence of hot oils and the like.

These and other objects will become readily apparent from the following detailed description of the invention.

This invention relates to novel disilacyclobutanes of the formula

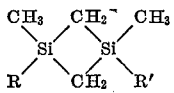

in which R is a perfluoroalkylethyl radical in which the perfluoroalkyl radical contains from 1 to 10 carbon atoms inclusive, and R′ is a member selected from the group consisting of an R radical and a methyl radical.

In the above generic formula, R is a perfluoroalkylethyl radical of the formula $C_xF_{2x+1}CH_2CH_2$— in which $x$ is an integer of from 1 to 10 inclusive. Hence, illustrative of the perfluoroalkylethyl radicals which are operative herein include the 3,3,3-trifluoropropyl, $C_{10}F_{21}C_2H_4$—, $(CF_3)_2CFCH_2CH_2$—, $CF_3CF_2CF(CF_3)CH_2CH_2$—, and the $C_2F_5CH_2CH_2$— radical, among others. While any of the above perfluoroalkylethyl radicals can function effectively in this invention, the 3,3,3-trifluoropropyl radical is preferred due to its commercial availability.

As related above, R′ is a member selected from the group consisting of an R radical and a methyl radical.

Methods for producing similar disilacyclobutanes are well known in the art, thus, an elaborate description for preparing the compounds of the present invention is deemed unnecessary. For purposes of brevity, the novel disilacyclobutanes defined herein are readily prepared by merely converting the appropriate silicon halides into the corresponding perfluoroalkylethyl-substituted compounds by reacting the halide with the corresponding Grignard reagent. As a means of illustration, one can prepare the disilacyclobutanes of this invention by reacting two moles of

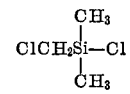

or an equimolar mixture of silicon halides of the formulae

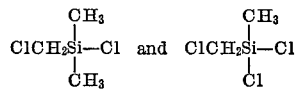

in the presence of magnesium until the monomer disappears. One mole of BrMgR, in which R is as above defined, is then introduced. The reaction is carried out in the presence of a suitable solvent such as tetrahydrofuran after which the disilacyclobutane is recovered.

The disilacyclobutanes are useful as lubricants and as release agents. As previously mentioned, they are also particularly useful for preparing silmethylene polymers which contain perfluoroalkylethyl radicals along the chain. The polymers prepared therefrom exhibit exceptional swell resistance in the presence of hot oils and withstand extreme temperatures in an inert atmosphere.

This invention also relates to polymers of the formula

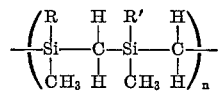

in which R and R′ are as above defined and $n$ is any integer.

It is to be noted, of course, that the above polymers can be copolymerized with other materials to produce polymers which contain other extraneous groups attached to the silicon atom. Thus, the above polymers can be copolymerized with units of the formula

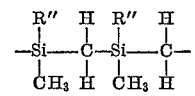

in which R″ is an alkyl radical such as the methyl radical, a functional group such as the vinyl radical or a hydrolyzable group. Illustrative of the hydrolyable groups which are operative herein include the alkoxy radical such as the methoxy, ethoxy, and propoxy radical, a halogen atom such as the chlorine and bromine atom, an acetoxy radical or the hydroxy radical. The functional groups related above are employed to more readily cure the polymers, particularly at low temperatures or in the presence of moisture at room temperature in ways known to the art. In general, the units should be present in an amount of less than 10 mol percent of the total polymer units. The polymer claims hereinafter appended include such copolymers.

As related above, $n$ can be any integer, e.g., from 2 to 1000.

The silmethylene polymers disclosed herein are easily prepared by simply polymerizing the substituted disilacyclobutanes of this invention in the presence of a platinum catalyst. Alternatively, the polymers can be prepared in the absence of a catalyst through the use of heat alone.

When a catalyst is employed, it can be a simple or complex salt of a platinum metal; however, the catalyst which is most preferred is chloroplatinic acid. The latter is a commercially available material, and its preferred and most available form is as the hexahydrate, i.e., $H_2PtCl_6 \cdot 6H_2O$. This is a crystalline material which can be used in this invention either in its pure form or as a solution. It is readily soluble in polar solvents, e.g., alcohols, water, and various glycols and esters. For ease of handling and measuring the relatively minute amounts needed herein, the use of a solution of the catalyst is preferred. Since only small amounts of the catalyst are reqiured, the possible reactivity of the solvent with one of the reactants is of no particular importance.

The catalyst may be present in widely varying proportions, e.g., from less than $10^{-5}$ to $10^{-3}$ part by weight or more of platinum metal per part of the substituted disilacyclobutane. However, in general, it is preferred to use the catalyst in amounts of the order of from $5 \times 10^{-5}$ to $10^{-4}$ part of metal per part of the disilacyclobutane.

The polymerization may be carried out over a wide range of temperatures, for example, from 10° C. to 200° C. It has been found, however, that temperatures in the range of from 50° C. to 120° C. are most suitable. The reaction may also be conducted over a wide range of pressures. For obvious reasons, it is preferred to operate at atmospheric pressures. When the polymerization is carried out solely by heat in the absence of a catalyst, temperatures in the range of from 180° C. to 200° C. have been found to be most suitable.

If desired, the reaction may be carried out in the presence of a suitable solvent such as hexane, benzene, toluene, or tetrahydrofuran. When a solvent is used, it can be employed in amounts of up to 200 parts by weight per 100 parts by weight of the disilacyclobutane.

When the catalyst is used, it can be separated from the resulting polymer. This is normally achieved by adding active charcoal to a solution of the polymer in a solvent, filtering the mixture and distilling off the solvent.

As noted, the polymers of the present invention withstand extreme temperatures in an inert atmosphere and exhibit exceptional swell resistance in the presence of hot oils and the like. For these reasons, the polymers can be employed in a wide variety of applications in which such characteristic properties are required.

The following examples are merely illustrative and are not intended to limit the invention which is properly delineated in the appended claims.

EXAMPLE 1

A mixture consisting of 142 grams of

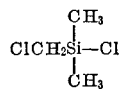

and 160 grams of

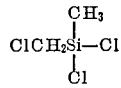

was placed in one liter of tetrahydrofuran. 80 grams of magnesium was slowly added at a temperature of about 50° C. A white precipitation of magnesium chloride occurred. The mixture was periodically analyzed by gas-liquid chromatography for two hours and no monomer remained. One mole of $BrCH_2CH_2CF_3$ was then slowly added over a period of one hour. After completion of the reaction, the mixture was filtered and the filtrate was distilled at reduced pressure. Prior to filtering, a nonsolvent for the magnesium halide was added to precipitate the salts without precipitating the desired product. After distillation, a product of the formula

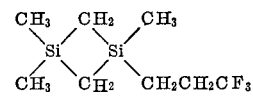

was obtained.

The above structure was confirmed by NMR, molecular weight, and elemental analysis of F, C, Si, and H.

EXAMPLE 2

When 320 grams of

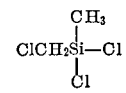

was substituted for the corresponding mixture of Example 1, a product of the formula

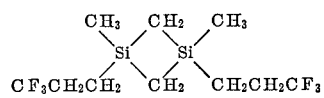

was obtained.

EXAMPLE 3

When the following reagents were substituted for the corresponding reagent of Example 1, the disilacyclobutanes noted below were obtained.

| Reagent | Disilacyclobutane |
| --- | --- |
| (A) $BrCH_2CH_2C_{10}F_{20}$ | $\begin{array}{c} CH_3 \quad CH_2 \quad CH_3 \\ \diagdown Si \diagup \diagdown Si \diagup \\ \diagup \quad \diagdown \quad \diagdown \\ CH_3 \quad CH_2 \quad CH_2CH_2C_{10}F_{21} \end{array}$ |
| (B) $BrCH_2CH_2CF(CF_3)_2$ | $\begin{array}{c} CH_3 \quad CH_2 \quad CH_3 \\ \diagdown Si \diagup \diagdown Si \diagup \\ \diagup \quad \diagdown \quad \diagdown \\ CH_3 \quad CH_2 \quad CH_2CH_2CF(CF_3)_2 \end{array}$ |
| (C) $BrCH_2CH_2(CF_3)CFCF_2CF_3$ | $\begin{array}{c} CH_3 \quad CH_2 \quad CH_3 \\ \diagdown Si \diagup \diagdown Si \diagup \\ \diagup \quad \diagdown \quad \diagdown \\ CH_3 \quad CH_2 \quad CH_2CH_2(CF_3)CFCF_2CF_3 \end{array}$ |

EXAMPLE 4

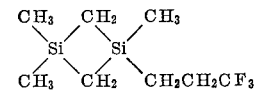

was placed in a closed vessel fitted with a stirrer. The material was heated to 100° C. and 28 parts per million of platinum as chloroplatinic acid was then added. The reaction was exothermic and a viscous, gummy product was obtained in a manner of 10 minutes. The polymer consisted of repeating units of the formula

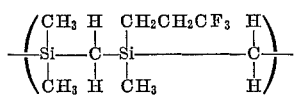

having a molecular weight of 150,000.

The above polymer was mixed with filler and vulcanized with dicumyl peroxide to form an elastomer. The elastomer was then tested for percentage swell. After 70 hours at 250° F. in ASTM #3 oil, the swell was 110.8 percent.

For comparative purposes, a silmethylene polymer containing only methyl radicals was tested for swell in the same fashion. Percentage of swell in this case was 254.0 percent, thus indicating that the polymers of the present invention exhibit exceptional swell resistance in the presence of hot oils.

EXAMPLE 5

When a disilacyclobutane having the formula

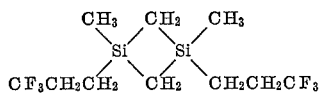

is substituted for the corresponding disilacyclobutane of Example 4, a polymer of the formula

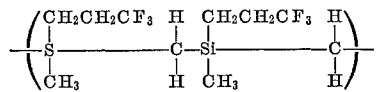

having a molecular weight of approximately 100,000 is obtained.

That which is claimed is:
1. Novel disilacyclobutanes of the formula

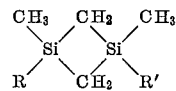

in which R is a perfluoroalkylethyl radical in which the perfluoroalkyl radical contains from 1 to 10 carbon atoms inclusive and R' is a member selected from the group consisting of an R radical and a methyl radical.

2. A disilacyclobutane as recited in claim 1 in which the formula is

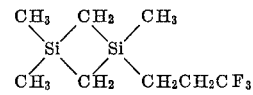

3. A disilacyclobutane as recited in claim 1 in which the formula is

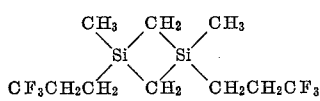

References Cited

UNITED STATES PATENTS 2,850,514   9/1958   Knoth _____ 260—448.2
3,178,392   4/1965   Kriner _____ 260—448.2 X
3,293,194  12/1966   Lovie et al. _____ 260—448.2 X HELEN M. McCARTHY, Primary Examiner P. F. SHAVER, Assistant Examiner U.S. Cl. X.R.

252—49.6; 260—46.5